United States Patent [19]

Sweere

[11] Patent Number: 4,836,478
[45] Date of Patent: Jun. 6, 1989

[54] SUSPENSION SYSTEM FOR PERSONAL COMPUTERS AND MONITORS

[75] Inventor: Harry C. Sweere, Minneapolis, Minn.

[73] Assignee: Ergotron, Inc., Bloomington, Minn.

[21] Appl. No.: 109,028

[22] Filed: Oct. 15, 1987

[51] Int. Cl.⁴ .............................................. A47G 29/00
[52] U.S. Cl. ................... 248/1 E; 248/123.1; 248/124; 248/279; 248/280.1
[58] Field of Search ............... 248/581, 585, 586, 589, 248/646, 648, 660, 661, 662, 122, 123.1, 124, 125, 278, 279, 280.1, 281.1, 285, 286, 323, 324, 325, 1 C, 1 E, 1 F, 1 H, 1 I

[56] References Cited

U.S. PATENT DOCUMENTS

| | | | |
|---|---|---|---|
| 507,364 | 10/1893 | Hiler | 248/323 |
| 1,733,107 | 10/1929 | Ahlberg | 248/278 X |
| 2,941,776 | 6/1960 | Lauterbach | 248/280.1 X |
| 3,345,461 | 10/1967 | Bunting | 248/123.1 X |
| 3,358,957 | 12/1967 | Lindenmuth | 248/1 E |
| 3,417,953 | 12/1968 | Hillquist | 248/324 |
| 3,433,444 | 3/1969 | Smith | 248/280.1 X |
| 3,662,981 | 5/1972 | Hogrebe | 248/278 |
| 4,082,244 | 4/1978 | Groff | 248/280.1 |
| 4,166,602 | 9/1979 | Nilsen | 248/123.1 X |
| 4,310,136 | 1/1982 | Mooney | 248/1 F |
| 4,447,031 | 5/1984 | Souder | 248/1 F |
| 4,453,687 | 6/1984 | Sweere | 248/183 |
| 4,562,987 | 1/1986 | Leeds . | |
| 4,591,122 | 5/1986 | Kreuzer | 248/281.1 X |
| 4,706,919 | 11/1987 | Soberalski | 248/281.1 |

FOREIGN PATENT DOCUMENTS 1510371 12/1967 France ................................ 248/124
1240837 7/1971 United Kingdom ................ 248/325

OTHER PUBLICATIONS

Fall 1987 Misco Catalog, pp. 40-41.
Nov. 1987, Ultimate Computer Supplies catalog, pp. 38-40.
Summer 1987, Businessland catalog, p. 9.
1987 (TS#2) Inmac catalog, p. 48.

Primary Examiner—J. Franklin Foss
Assistant Examiner—Robert A. Olson
Attorney, Agent, or Firm—Moore & Hansen

[57] ABSTRACT

A suspension system for a personal computer or monitor comprising a carriage in which the monitor or computer is mounted, the carriage being supported from above by a frictionally secured swivel and tilt mechanism in turn attached to a pivotable and rotatable support arm. The support arm is balanced by an adjustable pneumatic pressure cylinder, and is mounted on a roller assembly such that it may be carried along a path defined by a track assembly, thereby permitting the monitor or computer to be transported between first and second positions, as well as simultaneously being raised or lowered vertically, tilted, rotated, or swiveled. The track assembly may be attached to the underside of a shelving unit and incorporated into a modular partition system, or attached to a freestanding frame.

23 Claims, 2 Drawing Sheets

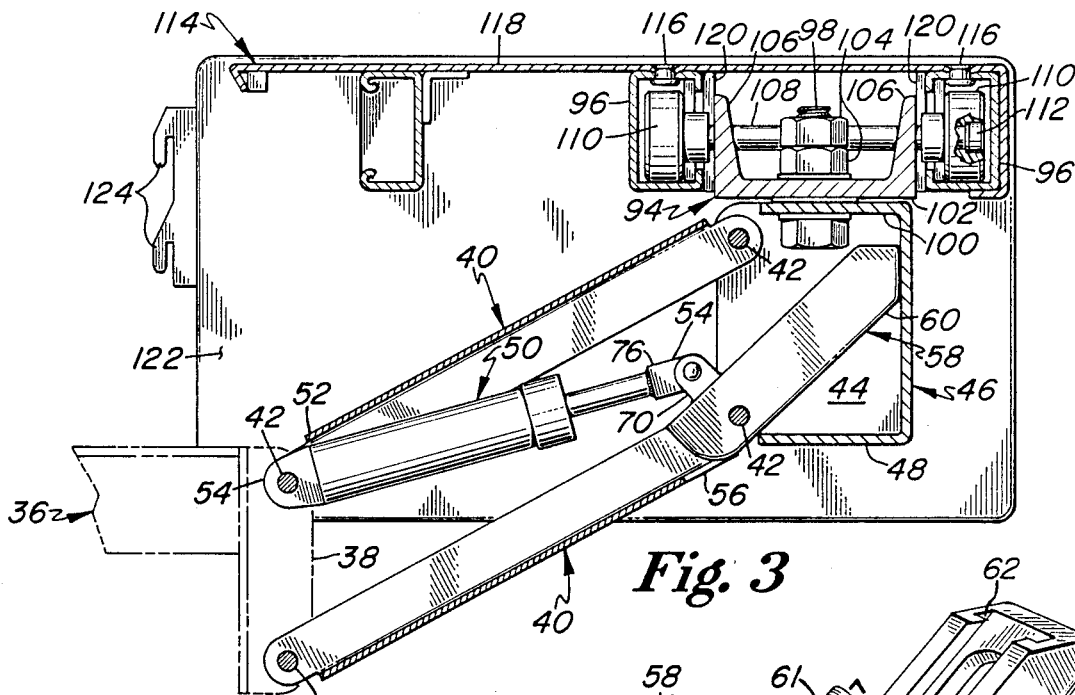
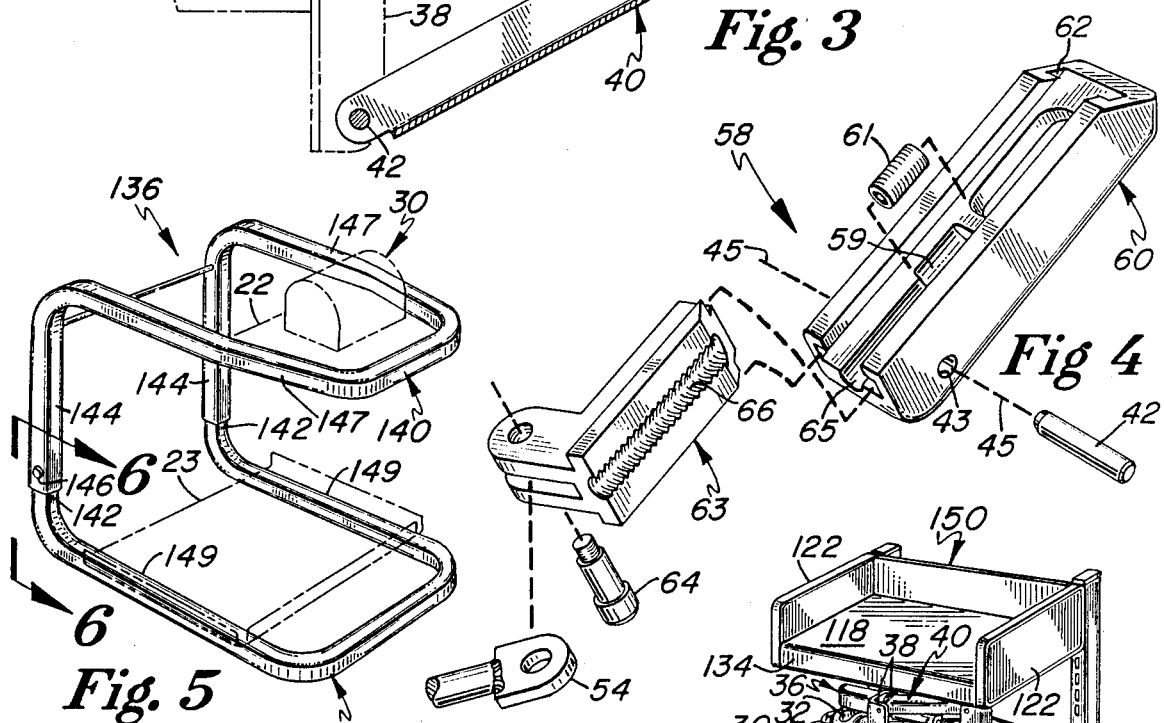
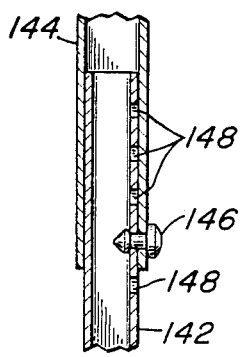
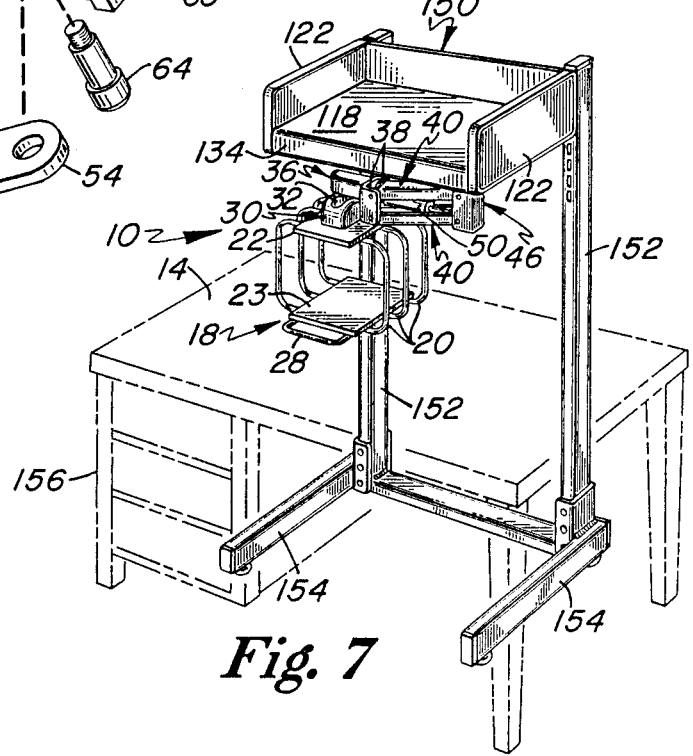
Fig. 3
Fig. 4
Fig. 5
Fig. 6
Fig. 7

SUSPENSION SYSTEM FOR PERSONAL COMPUTERS AND MONITORS

BACKGROUND OF THE INVENTION

This invention relates generally to stands and supports for personal computers and the cathode ray tube (CRT) monitors used with those computers, and particularly to an apparatus for supporting a variety of personal computers and their monitors completely above a work surface while permitting the height, tilt angle, or rotation of that monitor to be fully adjusted, allowing access to the personal computer control panel and disk drives, and further allowing that monitor to be "parked" in a location adjacent to but displaced from the work surface.

In very recent years, the power of personal computers has increased so dramatically that many personal computers now have capabilities possessed only a decade ago by sophisticated and bulky mainframe computers. With this increase in power, and the concurrent technical advances which have led to a decrease in the price of complex electronic components, these personal computers have become accessible to a far wider spectrum of users. The diverse applications presently flourishing include drafting using CAD/CAM or design drawing programs, desktop publishing, advertising and graphic layouts, and sales promotion and business presentations.

Traditional freestanding workstations, each costing tens of thousands of dollars, have similarly been increasing in capacity and decreasing in price, in an effort to stimulate direct competition with the new personal computers. As a result, many traditional dedictated workstations are no longer being produced as freestanding units complete with coordinated furnishings.

Paralleling the above trend, almost all mainframe computers have been converted to "on-line" use with thousands of independent users able to access the mainframe via communications lines and interactive CRT units located at the individual work places. Due to the increasing use of personal computers, workstations, and CRTs in conventional business, industrial, and engineering facilities and the unlimited variety of new settings to which personal computers are being constantly introduced, the need for convenient, efficient, and ergonomically designed working environments for individuals using computers has become acute. As a part of their daily activities, many people are required to speed all or part of their work or free time at a terminal, computer, or similar user interface.

It is not uncommon to find a computer or terminal sitting on an office desk or separate computer stand. As wide array of computer furniture designed to accommodate many difference system components and specific professional applications have been developed.

The need for customized furniture for computer users has also been dictated by the rapid increase in the number and variety of peripheral devices and interfaces which each user will have connected to their central processing unit (CPU). These peripheral devices include extended keyboards, large-screen or multiple page monitors, a mouse or trackball, joysticks, digitizers such as image scanners or drawing pads, printers, modems, hard disks and optional format disk drives, coprocessors, power supplies, networking interfaces, and many other specialized devices such as musical keyboards. The average drafting workstation will comprise a CPU with built in hard disk, one optional disk drive, keyboard, mouse, digitizer pad, and two monitors (one large screen). A standard desktop publishing workstation might include a CPU, large screen monitor, laser printer, image scanner, keyboard, mouse, external hard disk, and a disk drive.

These devices and components must generally be placed where easily accessible to the user. At a minimum, the monitors, keyboard, and mouse must be conveniently located on a top of a horizontal work surface, such as a desk at which the user will be seated. For most applications, the individual using the computer will likely be involved in processing information—that is, compiling and transforming information from one or more sources to produce a distinct product. Particularly in a business setting, it is rare that any completely original information is generated. Consequently, the user must have sufficient room available on the work surface or surrounding area for drawings, preliminary drafts, reference materials, artwork, manuals, and the like.

In those settings in which the personal computer is not the main focus of work activities, but is considered merely one of the many tools or resources available to an individual, the need for making that unit conveniently accessible while preventing it from becoming an obstacle to other activities becomes paramount. Moreover, where the computer is an adjunct to the normal daily activities, there will most likely be a wealth of available items competing for positions of priority on the person's desk or in their work area.

Many different apparatuses have been developed to assist in alleviating the problem of insufficient work space to accommodate the various components and peripherals which a person desires to have readily accessible. The most cumbersome component, other than the CPU itself (which may sometimes be positioned adjacent to the work surface) is the monitor. It is almost invariably necessary to position the monitor screen directly in front of the user, at or near eye level.

The most common items for achieving this result include monitor stands which straddle a computer or CPU, with the separate monitor resting on top. Some monitors are designed so they may sit directly on the computer, or are themselves freestanding and can be turned in different directions to provide wide or full height viewing.

Each of the monitor supports or stands presents several common drawbacks when used in a workstation or computer intensive environment.

Most use valuable space on the work surface, and permanently occupy that space even when the computer is not in use. The most versatile of such stands only permit a very limited degree of adjustment in the height, tilt angle, or rotation of the monitor, and adjustments will require loosening hardward fittings or physically lifting and moving the monitor. With monitors weighing anywhere between 15 and 120 lbs., such an alternative cannot be considered a convenient or practical solution.

One improvement on the standard monitor stand, permitting the greatest degree of flexibility and ease in making adjustments to the monitor position is the Swivel/Tilt Mounting Device for a Cathode Ray Tube disclosed in U.S. Pat. No. 4,453,687. This Swivel/Tilt device has been adapted for use in supporting various personal computer systems in which the monitor, CPU, and disk drives are combined in a common housing, with the keyboard and mouse being attached by cables. Representative examples of such a device are currently marketed by Ergotron, Inc., of Minneapolis, Minn., under the name "MacTilt."

Some monitor supports have extensible, cantilevered arms to support the monitor and permit it to be rotated, tilted, swiveled, raised and lowered to various positions. Representative examples of such extensible monitor supports include the "PC Float System" marketed by Global Computer Supplies, the "CRT Valet" marketed by Businessland of San Jose, Calif., and the "CRT Shuttle" also marketed by Global Computer Supplies and disclosed in U.S. Pat. No. 4,562,987.

The PC Float System has a pivotable arm which clamps to the lip of a desk and is supported by a pressurized pneumatic cylinder. The monitor platform is supported on a hemispherical globe resting within a basin. The globe, and thus the monitor platform and monitor, may be rotated within the torus to adjust the position of the monitor. The CRT Shuttle similarly clamps to a work surface and comprises a pair of jointed arms which permit an individual to manually raise or lower the monitor, or rotate it in several directions. Finally, the CRT Valet uses a cable biased cantilevered arm configuration which permits vertical and rotational movement of the monitor, as well as manual adjustment of the monitor position.

Each of these extensible arm systems provides some advantages over conventional monitor stands. They permit the user some degree of immediate movement of the monitor without having to lift the monitor or unlock hardware fittings. Each permits the monitor to be parked in a position away from the normal viewing position, and allow multiple users to share a monitor if their desks are situated accordingly. Finally, they include such options as gripping handles, an electrical power outlet, and options to support other equipment.

There are, however, several common disadvantages associated with these extensible arm systems. First, each requires that the main support arm be clamped to the lip of a desk with a mounting bracket or permanently attached to the desk if no lip is present. Each arm extends over the desk between the mounting bracket and the monitor, thus preventing the user from placing items in the area bounded by the sweep of the arm. While the CRT Valet arm is jointed in the vertical direction, the CRT Shuttle is jointed horizontally and the PC Float System is unjointed, thereby limiting any clearance between the work surface and arm, and consequently consuming more work area than the monitor alone. The ability to share a monitor is constrained by the extent to which the support arm will reach. Further, while each of the above extensible arm units allows the monitor to be parked when using a desk in an open area, it becomes impractical to park the monitor when the desk or work surface is bounded by walls or partitions.

A distinct solution to the problem of limited workspace is a desk unit having a clear or transparent work surface, the monitor being positioned beneath the work surface and tilted upward to that the screen may be viewed through the work surface by a user seated at the desk. Such a design, while conserving the entire work surface, is not ergonomically sound since it places the screen a greater distance from the user and requires that they must constantly look downward. This design also results in the user's view being obscured by items scattered on or about the work surface.

BRIEF SUMMARY OF THE INVENTION

It is therefore one object of this invention to design a suspension system in which a personal computer or monitor may be supported from above the computer of monitor, such that the suspension system permits complete access to all area of the underlying work surface, and does not require utilization of the work surface for mounting.

It is a further object of this invention to design the above suspension system such that it may accommodate a variety of sizes and weights of monitors or computers, allowing for vertical height adjustment, rotation of the monitor around its vertical axis, pivoting the monitor to various positions, and tilting the monitor forward or backward to adjust the viewing angle without having to loosen and tighten locking knobs or other hardware, and with such movements or adjustments being aided by mechanical means so as to substantially reduce any effort otherwise required.

It is yet another object of this invention to design the above suspension system such that the monitor may be moved laterally, or displaced from the normal viewing position in a linear manner, the extent and direction of that linear movement being independent of the length of any support arm or pivot assembly.

It is a related object of this invention to design the above suspension system such that it may be transported between various displaced but predetermined locations along either a linear or a non-linear path.

It is also a related object of this invention to design the above suspension system such that the monitor or personal computer being supported may be shared between individuals having work spaces which are displaced a significant distance apart, or are not positioned adjacent or proximate to one another.

It is similarly an object of the invention to design the above suspension system such that the linear movement of the suspension system is independent of the vertical, rotational, tilt or swiveling motion of the monitor or computer, so that these movements and adjustments may be accomplished simultaneously.

It is an additional object of this invention to design the above suspension system such that the monitor may be parked in a position displaced from the normal viewing position, without interference from adjoining walls, partitions, or work spaces.

It is a related object of this invention to design the above suspension system such that it may be incorporated into the design of various items of modular office furniture settings, such as wall partitions, or may alternately be made as a freestanding unit for use with desks and tables in an open area.

It is yet another object of this invention to design the above suspension system such that, when used with systems having separate monitor and CPU components, the CPU may be additionally supported in a position near the monitor and work surface, thereby allowing accessibility for cables and the operation of peripheral devices.

It is a distinct object of this invention to design the above suspension system such that it may be adjusted by the user to account for variations in monitor weight, as well as to compensate for the normal aging and wear on load bearing components.

Briefly described, the suspension system of this invention comprises a carriage in which the monitor is mounted, the carriage being supported from above by a frictionally secured swivel and tilt mechanism attached to a pivotable and rotatable support arm balanced by an adjustable pneumatic cylinder. The support arm is mounted on a roller assembly such that it may be carried along a path defined by a track assembly, thereby permitting the monitor or computer to be transported between distinct and isolated positions, as well as simultaneously being raised or lowered vertically, tilted, rotated, or swiveled. The track assembly may be attached to the underside of a shelving unit and incorporated into a modular partition system, or attached to a freestanding frame.

BRIEF DESRIPTION OF THE DRAWINGS

FIG. 3 is a cross sectional view of the roller and track assembly taken through line 3'3 of FIG. 2;

FIG. 4 is an partially cut away view of the pneumatic cylinder adjustment mechanism of the suspension system of FIG. 1;

FIG. 5 is a perspective view of an alternate embodiment of the monitor carriage of the suspension system of this invention;

FIG. 6 is a cross sectioal view of the monitor carriage taken through line 6—6 in FIG. 5;

FIG. 7 is a perspective view of the suspension system of this invention mounted on a freestanding frame member.

DESCRIPTION OF THE PREFERRED EMBODIMENTS

The suspension system for personal computers and monitors of this invention is shown in FIGS. 1-7 and referenced generally therein by the numeral 10.

A personal computer system may comprise any number of various components, including most notably a central processing unit (CPU) keyboard, and a display device 12 such as a monitor.

Figure 1:
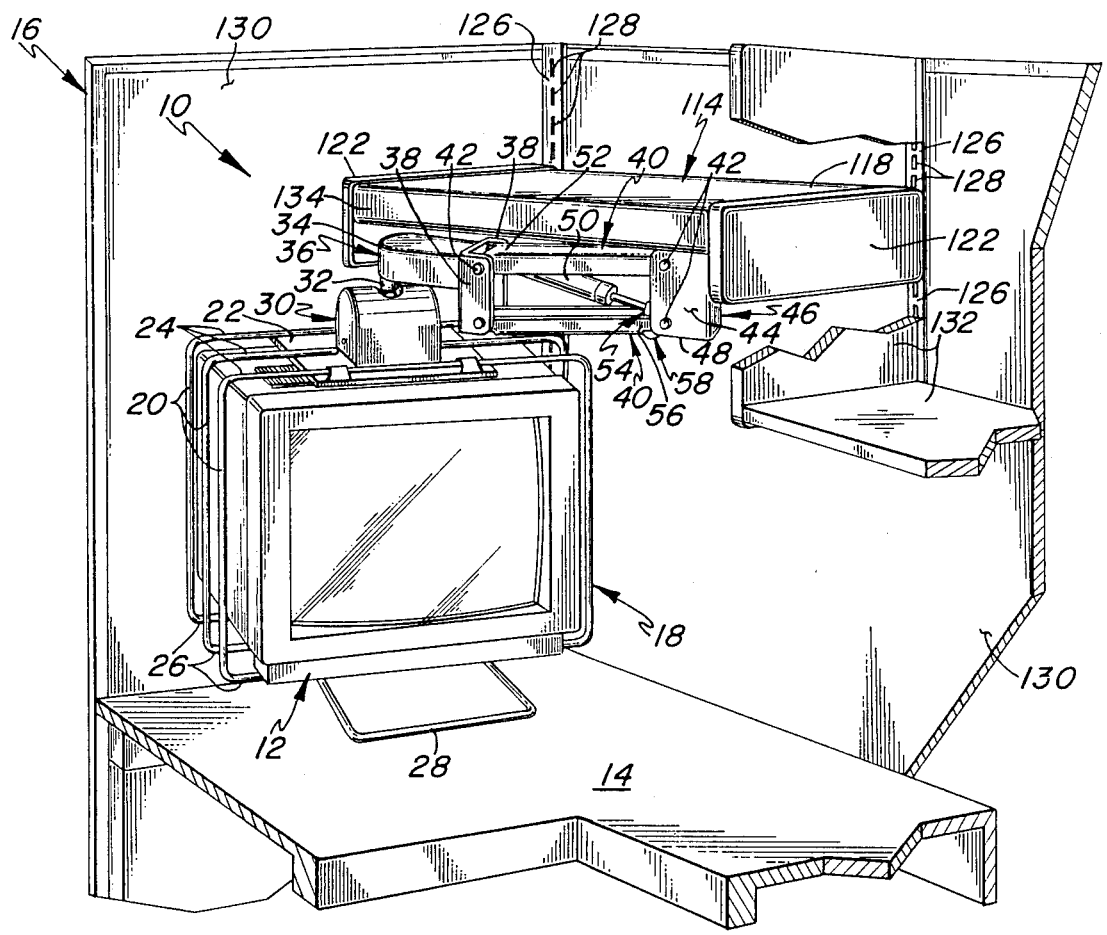
FIG. 1 is a perspective view of one embodiment of the suspension system of this invention incorporated into a modular partition unit.

Referring to FIG. 1, a monitor 12 may be seen supported by the suspension system 10 of this invention above a generally horizontal, planar work surface 14, which is bounded on two sides by a modular partition system 16.

The suspension system 10 consists of a monitor carriage 18 comprised of a number of wire members 20 bent into rectangular hoops and attached to form a generally box-shaped cage. Each wire member 20, as well as other components of the monitor carriage 18, may be coated with a plastic resin or rubber compound to prevent scratching or abrasion of the monitor 12. The wire members 20 are fastened to a support plate 22 at the top 24 of the monitor carriage 18 using welding or other similar fastening means. The wire members 20 are attached along the bottom 26 of the monitor carriage 18 by a monitor platform 23 (shown in FIG. 7) of any size or type known to the art and used for supporting a monitor 12 or other personal computer component.

The monitor carriage 18 may be sized and proportioned to accommodate any standard sizes of monitors 12 or personal computers, as well as any custom size suited for particular applications or systems. The monitor carriage 18 may include a gripping handle 28 formed from one of the wire members 20 and positioned to depend from the monitor carriage 18 and extend outwardly in front of the monitor 12.

Attached to the support plate 22 is a frictional swivel and tilt mechanism 30 of the type disclosed in the previously referenced U.S. Pat. No. 4,453,687. The swivel and tilt mechanism 30 is attached to the support plate 22 in an inverted position using any suitable fastening means such as welding. Although any of a variety of known mechanisms providing for rotation, tilting, swiveling, or other movement may be employed, it has proven particularly desirable to use the swivel and tilt mechanism 30 disclosed in the '687 patent, since conventional ball-and-socket mechanisms do not operate satisfactorily when inverted, and to obviate the need for complex locking or securing attachments.

The spindle or post 32 of the swivel and tilt mechanism 30 is received within and securely fastened to a post collar 34 using a locking pin or similar suitable fastening means, the post collar 34 in turn being attached to an extension arm 36. The extension arm 36 includes a pair of spaced apart mounting plates 38 which receive and engagingly bracket a pair of parallel support arms 40. Each support arm 40 is pivotably fastened between the mounting plates 38 by a securing pin 42 which extends entirely through the surfaces thereof. The arms 40, plates 38, arm 36 and collar 34, assembled as shown, collectively comprise one type of parallelogram linkage system usable for support of the tilt and swivel mechanism 30.

Figure 2:
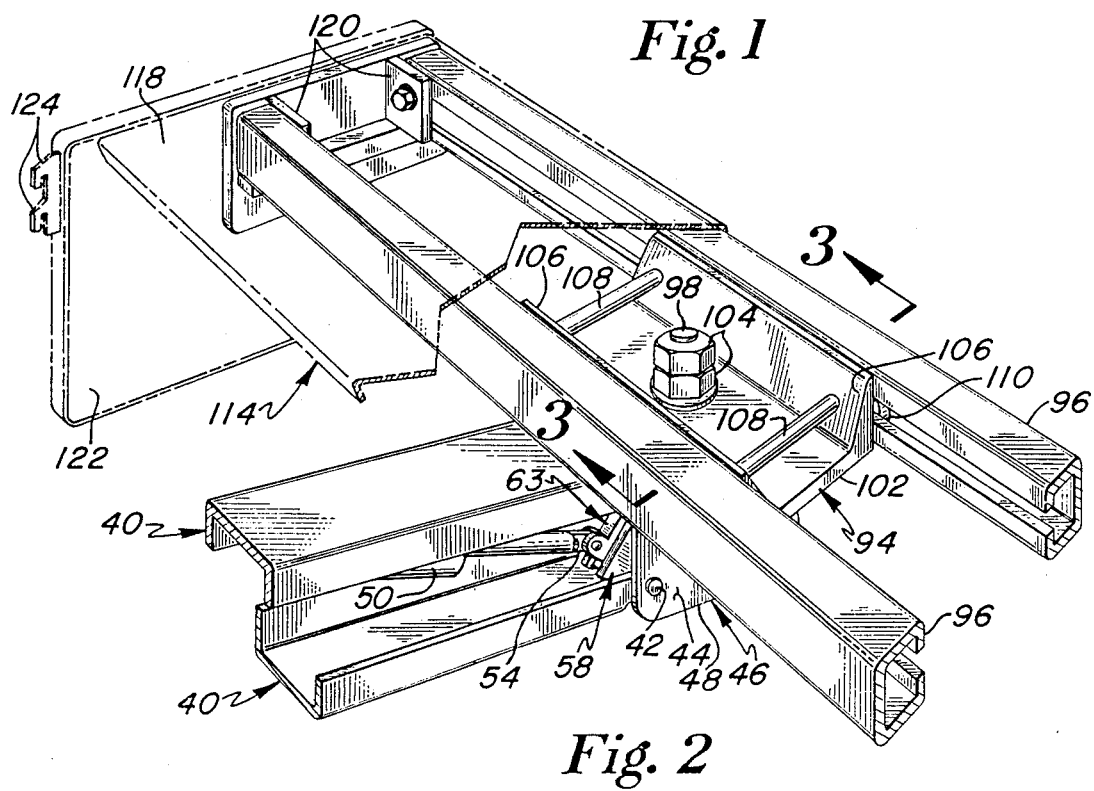
FIG. 2 is a perspective view showing the roller and track assembly and pivoting mechanism of the suspension system of FIG. 1.

The support arms 40 each comprise a section of straight channel having a U-shaped cross section, as shown in FIG. 2. Referring to FIGS. 1 and 2, the opposing ends of the support arms 40 are similarly received between and bracketed by the opposing sides 44 of a pivot housing 46, the support arms 40 being pivotably fastened to the pivot housing by a pair of securing pins 42. The pivot housing 46 may be of any shape or dimensions which allow the parallel support arms 40 to pivot downward relative to the pivot housing 46, thereby requiring a portion of the bottom section 48 of the pivot housing 46 to be cut away or exposed.

The pivot housing 46 similarly brackets and receives one end of a pneumatic pressure cylinder 50. The pneumatic pressure cylinder 50 may be any one of a type known to the art for assisting in the movement of or counterbalancing weighted objects. It has proven satisfactory to utilize a pneumatic cylinder 50 providing 160 lbs. of pressure to accommodate monitors weighting between 20 and 50 lbs., while a pneumatic cylinder 50 of 215 lbs. has proven satisfactory for monitors of 50-80 lbs.

The pneumatic cylinder 50 is attached at the distal end 52 of the top support arm 40 using the securing pin 42 and a standard single blade coupling yoke 54 of the type commonly used with similar cylinders and shown in FIG. 3. The pneumatic cylinder 50 extends diagonally between the support arms 40 to the proximal end 56 of the lower support arm 40. Referring again to FIGS. 3 and 4, it may be seen that the pneumatic cylinder 50 is fastened through yoke 55 to an adjustment mechanism 58 which permits the counterbalancing pressure exerted by the pneumatic cylinder 50 to be adjusted to accommodate different weight monitors 12, and to compensate for the gradual decrease in pneumatic pressure encountered over the usual like of a pneumatic cylinder 50.

Referring to FIG. 4 it may be seen that the adjustment mechanism 58 consists of a block 60 defining a guide channel 62 which extends through the total length of block 60. Block 60 in turn is mounted within the confines of the pivot housing 46 at an angle of 35° of vertical using the securing pin 42 which passes through the transverse bore 43 and has a central axis 45. Block 60 incorporates a recessed portion or "nest" 59 wherein rotates a commonly available set screw 61 which incorporates an Allen hex drive wrench access groove 65. A movable adjustment slide 63 is connected to the pneumatic cylinder coupling yoke 54 by means of a pin 64 inserted therethrough. The movable adjustment slide 63 is inserted into the guide channel 62 of block 60. The threaded channel 66 in movable adjustment slide 63 engages the set screw 61. When the set screw 61 is rotated by a standard Allen hex wrench (not shown) via the Allen wrench access groove 65, movable adjustment slide 63 moves up and down along the fixed block 60 to provide a movable anchor point or carrier member for the pneumatic cylinder 50, thereby increasing or decreasing the overall height or length of pneumatic cylinder 50 and thus the pressure exerted by the pneumatic cylinder 50.

Referring to FIGS. 2 and 3, it may be seen that the pivot housing 46 is mounted to a U-shaped truck member 94 which is positioned between a pair of parallel opposing track members 96, each track member 96 having a generally C-shaped cross section. These track members collectively define a tracking means unable with the invention. The pivot housing 46 is rotatably fastened to the truck member 94 by a centrally located bolt 98 which extends entirely through apertures in the top surface 100 of the pivot housing 46 and bottom surface 102 of the truck member 94, and is secured thereto by a pair of corresponding threaded fasteners 104. While the pivot housing 46 is supported by and suspended from the truck member 94 and is free to rotate relative to the truck member 94, the pivot housing 46 should be mounted to the truck member 94 such that the pivot housing 46 and the support arms 40 extending from the pivot housing 46 will not tilt downward or from side to side. To prevent such tilting, the facing surfaces 100, 102 of the pivot housing 46 and truck member 94 must be maintained generally parallel and proximate to one another in close confronting contact, and may be separated by a teflon pad or other suitable friction reducing element to ensure that the pivot housing 46 may be easily rotated. The pivot housing 46 and truck member 94 may additionally include any known type of collar or bearing assembly deisgned to maintain the pivot housing 46 in position beneath the truck member 94 and permit freedom of rotation.

Extending through the upstanding side walls 106 of the truck member 94 are a pair of axles 108, each axle 108 having a roller wheel 110 rotatably attached to the opposing ends thereof, with opposing pairs of the roller wheels 110 being received within the interior region of the track members 96. Each roller wheel 110 may be securely mounted to the axle 108 using any conventionally known method, such as by inserting the end of the axle 108 within a centrally located aperture defined by each of the the roller wheels 110, and fastening the roller wheels 110 to the ends of the axles 108 using a threaded fastener 112 having reverse threads.

As each of the roller wheels 110 and axles 108 are free to rotate, the truck member 94 may be carried back and forth along the track members 96 between various points. The track members 96 may each be substantially linear, as shown in FIG. 2, or may conform to any predetermined pattern or path having curves and turns of sufficient radius to permit the truck member 94 to be carried on the roller wheels 110 over the entire length of the track members 96.

The track members 96 are then attached to a support frame member 114 such as a shelving unit using welding or rivets 116 such that the track members 96 are suspended beneath the generally horizontal planar upper surface 118 of the shelving unit 144. Alternately, the track members 96 may be attached at each end to mounting brackets 120 extending inwardly from side plates 122 to support the track members 96 below the upper surface 118 of the shelving unit 114, particularly if the upper surface 118 is to be removable from the shelving unit 114.

The shelving unit 114 may be mounted to a modular partition system 16 using any conventional mounting system, such as tabs 124 which extend from the shelving unit 114 and are engagingly received within vertical brackets 126 having slots 128 corresponding to those tabs 124. The shelving unit 114 may be placed along a partition member 130 along with other accessory items such as shelves or bookcases 132.

In order to ensure that the top edge of the monitor 12 will be suspended substantially parallel to the work surface 14, the front edge 134 of the shelving unit 114 is canted upwardly approximately 1/16th of an inch relative to horizontal, as are the mounting plates 38 relative to the distal end 52 of the support arms 40.

In operation, the shelving unit 114 may be attached to a modular partition system 16 at a height permitting the suspension system 10 to depend thereunder with the monitor carriage 18 suspended over the work surface 14. The monitor 12 is placed within the monitor carriage 18, and the adjustment screw 78 within the block 60 is adjusted to accommodate the particular weight of the monitor 12. The CPU or other items may be placed on the shelving unit 114, with the keyboard, mouse, or other items placed on the work surface 14 and the components connected to the monitor 12 or CPU using cables.

A user seated at the work surface 14 may then grasp the gripping handle 28 at the front of the monitor carriage 18, and position the monitor screen at any appropriate height, angle, degree of rotation, and pivot the monitor carriage 18 toward or away from the front edge of the work surface 14. Similarly, the user may roll the truck member 94 along the track members 96 and thereby carry the entire suspension system 10 back and forth along the full extent of the track members 96. It is envisioned that the track members 96 may be placed along a path between two distinct points such as separate work stations such that a single monitor 12 may be shared or used at both points, or that the track members 96 may be curved to cooperate with various office settings and work station configurations.

The user, when desiring to place the monitor 12 away from the work surface 14, may lift the monitor carriage 18 to a position just below the shelving unit, rotate the monitor carriage 18 such that the front edge of the monitor 12 is generally parallel with the front edge 134 of the shelving unit 114, and pivot the support arms 40 and suspension system 10 to a position beneath the shelving unit 114 and displaced from the work surface.

It is also anticipated that various other configurations and embodiments of the suspension system 10 of this invention may be adapted for particular uses. One such embodiment of a saddle-shaped monitor carriage 136, shown in FIGS. 5 and 6, comprises a pair of curved tubular metal brace members 138, 140, with the upstanding leg portions 142 of the lower brace member 138 being received within the depending leg portions 144 of the upper brace member 140. The brace members 138, 140 may be fastened together as shown in FIG. 6 using threaded or push-type fasteners 146 which extend entirely through aligned apertures 148 in the leg portions 142, 144 of the corresponding brace members 138, 140. In this manner, the overall height of the monitor carriage 136 may be adjusted to fit a particular monitor 12 or personal computer, and to maximize the clearance between the work surface 14 and the monitor carriage 136. Thus, the saddle-shaped carriage 136 presents two pair of generally horizontal frame members 147, 149 spaced apart a variable distance by the vertical leg portions 142, 144 a support plate 22 may be fixed to the frame members 147 in any known manner and attaches to the tilt and swivel mechanism 30, here shown in phantom. A platform member 23 is fixed to the lower frame members 149 to support the monitor 12.

Another embodiment of the suspension system 10 for use with desks and other work surfaces 14 not bounded by partitions 16 is shown in FIG. 7. In this freestanding embodiment, the suspension system 10 is similarly supported beneath a shelving unit 150 which is attached to a pair of vertical frame members 152 and a support base member 154 or pedestal which may extend under at least a portion of the desk 156 and suspension arms 40 to provide the leverage necessary to support a personal computer or monitor 12 along with the suspension system 10 itself. In arrangements where the monitor and personal computer are separate units, the shelving unit 150 can be used to mount the personal computer within easy reach of the operator, as shown in phantom in FIG. 7.

Although the preferred embodiments of the suspension system 10 of this invention have been disclosed above, it is understood that various modifications or alterations may be made in the suspension system 10 without departing from the spirit and scope of the appended claims.

What is claimed is:

1. A suspension system for positioning and supporting a display device of a personal computer above a work surface, the suspension system comprising:
    a carriage to receive the display device therein;
    a tilt and swivel mechanism attached to and extending above said carriage, said tilt and swivel mechanism allowing said carriage to be tilted and rotated relative to the work surface;
    a parallelogram linkage system including first and second substantially parallel suspension arms, each said arm having a distal end and a proximal end and said linkage system carrying said tilt and swivel mechanism adjacent said distal ends of said arms;
    a pivot housing, said pivot housing being pivotably fastened to and supporting said suspension arms at said proximal ends thereof;
    a truck member pivotably mounting said pivot housing;
    tracking means, said truck member being mounted for movement along said tracking means, said carriage, said mechanism, said linkage system and said housing being movable between a first position disposed over the work surface and a second position displaced from said first position as said truck member is moved relative to said tracking means;
    a support frame member, said tracking means being attached to said frame member;
    a pressure cylinder for urging said carriage and the display device upwardly in a generally vertical direction away from the work surface and having first and second ends spaced apart by a length, said first end of said pressure cylinder being mounted adjacent to the distal end of said first suspension arm and said second end of said pressure cylinder being mounted adjacent to the proximal end of said second suspension arm; and
    means for adjusting the length between said first and second ends of said pressure cylinder, said adjusting means comprising:
        a block, said block including a guide channel extending therethrough and said guide channel positioned at an angle relative to the length of said pressure cylinder, and further including a recessed portion within said block;
        a carrier member mounted for slidable movement within said guide channel;
        a set screw contained within said recessed portion and threadably engaging said carrier member such that rotation of said set screw moves said carrier member relative to said block; and
        means for coupling said carrier member to said pressure cylinder.

2. The suspension system of claim 1 wherein said guide channel is substantially straight and said recessed portion is elongated and substantially parallel to said guide channel such that said set screw, when positioned in said recessed portion, has a longitudinal axis oriented substantially parallel to said guide channel.

3. The suspension system of claim 1 wherein said block further includes a transverse bore, and said bore has a central axis about which one of said suspension arms is mounted for pivotable movement.

4. The suspension system of claim 3 wherein said block has first and second ends and said transverse bore is adjacent said first end of said block and said second end of said block bears against said pivot housing.

5. The suspension system of claim 1 wherein said block further includes an elongated set screw access groove positioned along and parallel to said guide channel and offset therefrom, said groove positioned to confront said carrier member.

6. The suspension system of claim 5 wherein said carrier member includes a threaded channel threadably engaging said set screw so as to move said carrier member in response to set screw rotation.

7. The suspension system of claim 1 wherein said carrier member includes a threaded channel threadably engaging said set screw so as to move said carrier member in response to set screw rotation.

8. A suspension system for positioning the supporting a display device of a personal computer above a work surface, said suspension system comprising:
    a carriage to receive the display device therein;
    a tilt and swivel mechanism attached to and extending above said carriage, said tilt and swivel mechanism allowing said carriage to be tilted and rotated relative to the work surface;
    a parallelogram linkage system including first and second substantially parallel suspension arms, each said arm having a distal end and a proximal end and said linkage system carrying said tilt and swivel mechanism adjacent said distal ends of said arms;

a pivot housing, said pivot housing being pivotably mounted to and supporting said suspension arms at said proximal ends thereof;

a pressure cylinder for urging said carriage and the display device upwardly in a generally vertical direction away from the work surface and having first and second ends spaced apart by a length, said first end of said pressure cylinder being mounted adjacent to the distal end of said first suspension arm and said second end of said pressure cylinder being mounted adjacent to the proximal end of said second suspension arm;

a truck member pivotably mounting said pivot housing;

tracking means, said truck member being mounted for movement along said tracking means, said carriage being movable between a first position disposed over the work surface and a second position displaced from said first position as said truck member is moved relative to said tracking means;

a rectangular support frame member above the work surface and carrying said tracking means, said frame member having a length dimension substantially exceeding its width dimension, and having its length dimension substantially parallel to said tracking means; and said linkage system and said truck member being moveable between operating and storage positions such that when in storage position said linkage assembly is generally parallel to said tracking means and said length dimension.

9. The suspension system of claim 8 wherein said support frame member has a front edge and a rear edge, said edges extending along said long dimension of said support frame, said tracking means being positioned closely adjacent said front edge and parallel thereto to permit increased outward extension of said carriage beyond said front edge and toward the operator when in operating position and allowing free movement and storage of said carriage, tilt and swivel mechanism, linkage system, pivot housing, truck member and tracking means wholly below said frame support member.

10. The suspension system of claim 8 wherein said support frame member overlies said track member and at least part of said first and second suspension arms to thereby limit upward movement of said arms and to constrain movement of said carriage below the level of said support frame when in operating and storage positions.

11. The suspension system of claim 8 wherein said pivot housing permits said parallelogram linkage to swing in a horizontal plane below and about said tracking means through an angle of at least 90° from said tracking means.

12. The suspension system of claim 8 wherein said carriage includes a saddle frame having a first pair of generally horizontal frame members which are spaced apart a distance from one another and extend forwardly and rearwardly of the display device so as to support the display device, said frame further including a second pair of generally horizontal frame members spaced apart from one another and extending forwardly and rearwardly of said tilt and swivel mechanism to closely overly the display device and prevent it from tipping forwardly from the carriage during tilting, said first and second pairs of frame members being spaced vertically a distance apart and connected by a pair of vertical leg portions.

13. The suspension system of claim 12 wherein said support frame member comprises a shelving unit having rearwardly extending tabs so as to serve as a component in a modular partition system.

14. A suspension system for positioning and supporting a display device of a personal computer above a work surface, said suspension system comprising:

a carriage to receive the display device therein;

a tilt and swivel mechanism attached to and extending above said carriage, said tilt and swivel mechanism allowing said carriage to be tilted and rotated relative to the work surface;

a parallelogram linkage system including first and second substantially parallel suspension arms, each said arm having a distal end and a proximal end and said linkage system carrying said tilt and swivel mechanism adjacent said distal ends of said arms;

a pivot housing, said pivot housing being pivotably fastened to and supporting said suspension arms at said proximal ends thereof;

a pressure cylinder for urging the carriage and display device upwardly in a generally vertical direction away from the work surface and having first and second ends spaced apart by a length, said first end of said pressure cylinder being mounted adjacent to the distal end of said first suspension arm and said second end of said pressure cylinder being mounted adjacent to the proximal end of said second suspension arm;

a truck member pivotably mounting said pivot housing; and tracking means, said truck member being mounted for movement along said tracking means, said carriage being movable between a first position disposed over the work surface and a second position displaced from said first position as said truck member is moved relative to said tracking means; and said carriage further including a saddle frame having a first pair of generally horizontal frame members which are spaced apart a distance from one another and support the display device, said frame further including a second pair of generally horizontal frame members spaced apart from one another and extending forwardly and rearwardly of said tilt and swivel mechanism to closely overlie and contain the display device and restrain it from tipping forwardly from the carriage during tilting, said first and second pairs of frame members being spaced vertically a distance apart and connected by a pair of vertical leg portions.

15. A suspension system for positioning and supporting a display device of a personal computer above a work surface for the convenience of an operator, said suspension system comprising:

a carriage to receive the display device therein and having a front and back;

a tilt and swivel mechanism attached to and extending above said carriage, said tilt and swivel mechanism allowing said carriage to be tilted and rotated relative to the work surface;

a parallelogram linkage system including first and second substantially parallel suspension arms, each said arm having a distal end and a proximal end and said linkage system carrying said tilt and swivel mechanism adjacent said distal ends of said arms;

a pivot housing, said pivot housing being pivotably fastened to and supporting said suspension arms at said proximal ends thereof;

a pressure cylinder for urging the carriage and display device upwardly in a generally vertical direction away from the work surface and having first and second ends spaced apart by a length, said first end of said pressure cylinder being mounted adjacent to the distal end of said first suspension arm and said second end of said pressure cylinder being mounted adjacent to the proximal end of said second suspension arm;

a truck member pivotably mounting said pivot housing and allowing said linkage system to extend radially from said truck member;

tracking means supported above the work surface, said truck member being mounted for sliding movement along said tracking means, said carriage being movable between a first position disposed over the work surface and a second position displaced from said first position as said truck member is moved relative to said tracking means; and said tilt and swivel mechanism being rotatable through substantially 360° and said pivot housing being rotatable relative to said tracking means through at least 180° while fully supporting the carriage over the work surface to thereby permit sliding, swinging and rotational movement of said carriage to substantially any position around and below said tracking means and within the radius defined by said linkage system while allowing the front of the carriage to confront the operator in all such positions.

16. The suspension system of claim 15 wherein the support frame member comprises a shelving unit having rearwardly extending tabs so as to serve as a component in a modular partition system.

17. The suspension system of claim 15 and further including:

means for adjusting the length between said first and second ends of said pressure cylinder, said adjusting means comprising:

a block, said block including a guide channel extending therethrough and said guide channel positioned at an angle relative to the length of said pressure cylinder, and further including a recessed portion within said block; a carrier member mounted for slidable movement within said guide channel; a set screw contained within said recessed portion and threadably engaging said carrier member such that rotation of said set screw moves said carrier member relative to said block; and means for coupling said carrier member to said pressure cylinder.

18. The suspension system of claim 17 wherein said guide channel is substantially straight and said recessed portion is elongated and substantially parallel to said guide channel such that said set screw, when positioned in said recessed portion, has a longitudinal axis oriented substantially parallel to said guide channel.

19. The suspension system of claim 17 wherein said block further includes an elongated set screw access groove positioned along and parallel to said guide channel and offset therefrom, said groove positioned to confront said carrier member.

20. The suspension system of claim 19 wherein said carrier member includes a threaded channel threadably engaging said set screw so as to move said carrier member in response to set screw rotation.

21. The suspension system of claim 15 and further including:

a rectangular support frame member supportable above the work surface and carrying said tracking means, said frame member having a length dimension substantially exceeding its width dimension;

said tracking means being substantially parallel to said length dimension of said frame member; and said linkage system and truck member being moveable between operating and storage positions such that when in storage position said linkage assembly is generally parallel to said tracking means and to said length dimension.

22. The suspension system of claim 15 for use adjacent to a work surface having a height, said suspension system further comprising:

a base member; and one or more vertical frame members extending upwardly from said base member to a height greater than the height of the work surface, whereby the support frame member may be mounted to said vertical frame member at a height substantially exceeding that of the work surface so as to avoid obstructing the work surface.

23. A suspension system for positioning and supporting a display device of a personal computer above a work surface for the convenience of an operator, said suspension system comprising:

a carriage to receive the display device therein and having a front and back;

a tilt and swivel mechanism attached to and extending above said carriage, said tilt and swivel mechanism allowing said carriage to be tilted and rotated relative to the work surface;

a parallelogram linkage system including first and second substantially parallel suspension arms, each said arm having a distal end and a proximal end and said linkage system carrying said tilt and swivel mechanism adjacent said distal ends of said arms;

a pivot housing, said pivot housing being pivotably fastened to and supporting said suspension arms at said proximal ends thereof;

upward biasing means to urge the carriage and display device upwardly in a generally vertical direction away from the work surface;

a truck member pivotally mounting said pivot housing and allowing said linkage system to extend radially from said truck member;

tracking means supported above the work surface, said truck member being mounted for sliding movement along said tracking means, said carriage being movable between a first position disposed over the work surface and a second position displaced from said first position as said truck member is moved relative to said tracking means; and said tilt and swivel mechanism being rotatable through substantially 360° and said pivot housing being rotatable relative to said tracking means through at least 180° while fully supporting the carriage over the work surface to thereby permit sliding, swinging and rotational movement of said carriage to substantially any position around and below said tracking means and within the radius defined by said linkage system while allowing the front of the carriage to confront the operator in all such positions.

* * * * *